United States Patent
Clowes et al.

(10) Patent No.: US 10,625,243 B2
(45) Date of Patent: Apr. 21, 2020

(54) GASOLINE PARTICULATE FILTER

(71) Applicant: JOHNSON MATTHEY PUBLIC LIMITED COMPANY, London (GB)

(72) Inventors: Lucy Clowes, Royston (GB); Oliver Destecroix, Royston (GB); John Benjamin Goodwin, Royston (GB); Michael Anthony Howard, Wayne, PA (US); Fezile Lakadamyali, Royston (GB); Sarah Frances Lockett, London (GB); Paul Millington, Reading (GB); Chris Robson, Royston (GB)

(73) Assignee: Johnson Matthey Public Limited Company, London (GB)

( * ) Notice: Subject to any disclaimer, the term of this patent is extended or adjusted under 35 U.S.C. 154(b) by 110 days.

(21) Appl. No.: 16/065,439

(22) PCT Filed: Dec. 23, 2016

(86) PCT No.: PCT/GB2016/054070
§ 371 (c)(1),
(2) Date: Jun. 22, 2018

(87) PCT Pub. No.: WO2017/109514
PCT Pub. Date: Jun. 29, 2017

(65) Prior Publication Data
US 2019/0009254 A1 Jan. 10, 2019

(30) Foreign Application Priority Data

Mar. 23, 2016 (GB) .................................. 1604915.7

(51) Int. Cl.
*B01J 23/46* (2006.01)
*B01J 21/04* (2006.01)
(Continued)

(52) U.S. Cl.
CPC .......... *B01J 23/464* (2013.01); *B01D 53/945* (2013.01); *B01J 21/04* (2013.01); *B01J 23/10* (2013.01);
(Continued)

(58) Field of Classification Search
CPC .............. B01D 53/9445; B01D 53/945; B01D 53/9454; B01D 2255/102;
(Continued)

(56) References Cited

U.S. PATENT DOCUMENTS 4,619,909 A * 10/1986 Ono .................. B01J 37/024
502/303
5,041,407 A * 8/1991 Williamson ......... B01D 53/945
423/213.5
(Continued)

FOREIGN PATENT DOCUMENTS

EP 3034164 A1 6/2016
GB 2524662 A1 9/2015
(Continued)

*Primary Examiner* — Timothy C Vanoy (57) ABSTRACT

A catalytic wall-flow monolith for use in an emission treatment system comprises a porous substrate and a three-way catalyst (TWC), wherein the TWC is distributed substantially throughout the porous substrate and wherein the TWC comprises:
(i) alumina;
(ii) one or more platinum group metals; and
(iii) an oxygen storage component (OSC),
wherein the OSC comprises ceria or one or more mixed oxides comprising cerium and is present in a ratio by weight of OSC to alumina of from 65:35 to 85:15.

19 Claims, 3 Drawing Sheets

A-A line cross-sectional view (51) Int. Cl.
*B01J 23/10* (2006.01)
*B01J 35/04* (2006.01)
*B01J 37/02* (2006.01)
*B01J 37/08* (2006.01)
*B01D 53/94* (2006.01)
*F01N 3/10* (2006.01)
*F01N 3/035* (2006.01)
*F01N 3/28* (2006.01)
*B01J 23/63* (2006.01)
*B01J 35/00* (2006.01)
*F01N 13/00* (2010.01)

(52) U.S. Cl.
CPC ........... *B01J 23/63* (2013.01); *B01J 35/0006* (2013.01); *B01J 35/04* (2013.01); *B01J 37/0228* (2013.01); *B01J 37/08* (2013.01); *F01N 3/035* (2013.01); *F01N 3/101* (2013.01); *F01N 3/2803* (2013.01); *F01N 13/00* (2013.01); *B01D 2255/1021* (2013.01); *B01D 2255/1023* (2013.01); *B01D 2255/1025* (2013.01); *B01D 2255/2066* (2013.01); *B01D 2255/2092* (2013.01); *B01D 2255/407* (2013.01); *B01D 2255/908* (2013.01); *B01D 2255/9155* (2013.01); *F01N 2330/02* (2013.01); *F01N 2330/06* (2013.01); *F01N 2510/06* (2013.01); *Y02A 50/2324* (2018.01); *Y02T 10/22* (2013.01)

(58) Field of Classification Search
CPC .... B01D 2255/2065; B01D 2255/9155; B01D 2258/012; B01J 35/0093; B01J 23/56; B01J 23/63; B01J 35/0073; B01J 37/0201; F01N 3/035; F01N 3/101; F01N 3/2803; F01N 2250/02; F01N 2330/06
See application file for complete search history.

(56) References Cited

U.S. PATENT DOCUMENTS

| | | | |
|---|---|---|---|
| 5,473,887 A | 12/1995 | Takeshima et al. | |
| 5,672,557 A * | 9/1997 | Williamson | B01D 53/945 502/303 |
| 6,627,777 B2 * | 9/2003 | Rossi | B01J 23/42 502/327 |
| 9,040,003 B2 * | 5/2015 | Andersen | B01D 53/9413 423/210 |
| 9,833,771 B2 | 12/2017 | Goto et al. | |
| 2002/0077514 A1 * | 6/2002 | Rossi | B01J 23/42 570/226 |
| 2003/0207759 A1 * | 11/2003 | Nakamura | B01D 53/945 502/304 |
| 2009/0087365 A1 | 4/2009 | Klingmann et al. | |
| 2009/0193796 A1 | 8/2009 | Wei et al. | |
| 2010/0275579 A1 | 11/2010 | Klingmann et al. | |
| 2011/0212639 A1 | 9/2011 | Paquette et al. | |
| 2013/0336864 A1 | 12/2013 | Zheng | |
| 2014/0369912 A1 | 12/2014 | Zheng | |
| 2016/0228856 A1 * | 8/2016 | Felix | B01D 53/945 |
| 2018/0133651 A1 * | 5/2018 | Minami | B01J 23/63 |
| 2019/0134614 A1 * | 5/2019 | Patil | B01J 37/0244 |

FOREIGN PATENT DOCUMENTS

| | | |
|---|---|---|
| JP | 2006298759 B2 | 11/2006 |
| JP | 2010012397 A1 | 1/2010 |
| JP | 2011212639 A1 | 10/2011 |
| WO | WO 99/047260 A1 | 9/1999 |
| WO | WO 2011080525 A1 | 7/2011 |
| WO | WO 2011133503 A2 | 10/2011 |
| WO | WO 2014125296 A1 | 8/2014 |
| WO | WO 2014195685 A1 | 12/2014 |
| WO | WO 2015145122 A2 | 10/2015 |
| WO | WO 2015079908 A1 | 3/2017 |

* cited by examiner

FIG. 1A

FIG. 1B
A-A line cross-sectional view

FIG. 2

GASOLINE PARTICULATE FILTER

CROSS-REFERENCE TO RELATED APPLICATIONS

This national stage application claims priority benefit of PCT Patent Application No. PCTGB2016054070, filed Dec. 23, 2016 and Great Britain Patent Applications 1604915.7 and 1522917.2, filed Mar. 23, 2016 and Dec. 24, 2015, respectively, the disclosures of which are incorporated herein by reference in their entireties for all purposes.

FIELD OF THE INVENTION

The present invention relates to a particulate filter, in particular a catalyst-coated monolith for use in an emission treatment system of a positive ignition, e.g. spark ignition, gasoline-fuelled internal combustion engine, preferably a gasoline direct ignition engine. The monolith provides an effective method of remediating engine exhaust streams.

BACKGROUND OF THE INVENTION

Gasoline engines produce combustion exhaust streams containing hydrocarbons, carbon monoxide, and oxides of nitrogen in conjunction with particulates. It is known to treat the gases with a three-way catalyst composition, and it is known to recover the particulates in particulate traps such as soot filters.

Historically, gasoline engines which are operated predominantly stoichiometrically have been designed such that low levels of particulates were formed. However, gasoline direct injection (GDI) engines, which are finding increasing application due to their fuel efficiency, can have lean burn conditions and stratified combustion resulting in the generation of particulates. Particulate emissions for engines fuelled by gasoline fuel, such as gasoline direct injection engines, are being subject to regulations and existing after-treatment systems for gasoline engines are not suitable for achieving the proposed particulate matter standard.

In contrast to particulates generated by diesel lean burning engines, the particulates generated by gasoline engines tend to be finer and at lower levels. This is due to the different combustion conditions of a diesel engine as compared to a gasoline engine. For example, gasoline engines run at a higher temperature than diesel engines. Also, the resultant hydrocarbon components are different in the emissions of gasoline engines as compared to diesel engines.

Emission standards for unburned hydrocarbons, carbon monoxide and nitrogen oxide pollutants continue to become more stringent. In order to meet such standards, catalytic converters containing a three-way catalyst (TWC) are located in the exhaust gas line of gasoline-fuelled internal combustion engines. Such catalysts promote the oxidation by oxygen and oxides of nitrogen in the exhaust gas stream of unburned hydrocarbons and carbon monoxide, as well as the concomitant reduction of nitrogen oxides to nitrogen.

Emission legislation in Europe from 1 Sep. 2014 (Euro 6) requires control of the number of particles emitted from both diesel and gasoline (positive ignition) passenger cars. For gasoline EU light duty vehicles the allowable limits are: 1000 mg/km carbon monoxide; 60 mg/km nitrogen oxides ($NO_x$); 100 mg/km total hydrocarbons (of which ≤68 mg/km are non-methane hydrocarbons); and 4.5 mg/km particulate matter ((PM) for direct injection engines only). The Euro 6 PM standard will be phased in over a number of years with the standard from the beginning of 2014 being set at $6.0 \times 10^{12}$ per km (Euro 6) and the standard set from the beginning of 2017 being $6.0 \times 10^{11}$ per km (Euro 6c). In a practical sense, the range of particulates that are legislated for are between 23 nm and 3 µm.

In the United States, on 22 Mar. 2012, the State of California Air Resources Board (CARB) adopted new Exhaust Standards from 2017 and subsequent model year "LEV III" passenger cars, light-duty trucks and medium-duty vehicles which include a 3 mg/mile emission limit, with a later introduction of 1 mg/mi possible, as long as various interim reviews deem it feasible.

The new Euro 6 (Euro 6 and Euro 6c) emission standard presents a number of challenging design problems for meeting gasoline emission standards. In particular, how to design a filter, or an exhaust system including a filter, for reducing the number of PM gasoline (positive ignition) emissions, yet at the same time meeting the emission standards for non-PM pollutants such as one or more of oxides of nitrogen ($NO_x$), carbon monoxide (CO) and unburned hydrocarbons (HC), all at an acceptable back pressure, e.g. as measured by maximum on-cycle backpressure on the EU drive cycle.

It is known in gasoline systems to provide a three-way catalyst (TWC) located on a substrate carrier, such as a flow-through monolith. It is also known to combine the TWC and particulate removal functions in a single device by coating a TWC onto a wall-flow monolith (particulate filter). An example is described in US 2009/0193796.

Accordingly, it is desirable to provide an improved particulate filter and/or tackle at least some of the problems associated with the prior art or, at least, to provide a commercially useful alternative thereto.

US 2010/275579A1 discloses a catalytically active particulate filter, an exhaust gas cleaning system and a process for cleaning the exhaust gases of predominantly stoichiometrically operated internal combustion engines, which are said to be suitable for removing particulates from the exhaust gas, as well as the gaseous CO, HC and NOx pollutants also. The particulate filter comprises a filter body and a catalytically active coating consisting of two layers. The first layer is in contact with the incoming exhaust gas, the second layer with the outgoing exhaust gas. Both layers contain alumina. The first layer contains palladium. The second layer contains, in addition to rhodium, an oxygen-storing cerium/zirconium mixed oxide.

US 2009/087365A1 discloses a catalytically active particulate filter, an exhaust gas cleaning system and a process for cleaning the exhaust gases of predominantly stoichiometrically operated internal combustion engines, which are said to be suitable for removing particulates from the exhaust gas, as well as the gaseous CO, HC and NOx pollutants also. The particulate filter comprises a filter body and a catalytically active coating consisting of two layers. Both layers contain alumina. The first layer contains palladium. The second layer contains rhodium. The second layer is disposed above the first layer.

WO 2011/133503 discloses exhaust systems and components suitable for use in conjunction with gasoline engines to capture particulates in addition to reducing gaseous emission such as hydrocarbons, nitrogen oxides, and carbon monoxides. Exhaust treatment systems comprising a three-way conversion (TWC) catalyst located on a particulate filters are provided. Coated particle filters having washcoat loadings in the range of 1 to 4 g/ft³ are said to result in minimal impact on back pressure while simultaneously providing TWC catalytic activity and particle trapping functionality sufficient to meet Euro 6 emission standards. Relatively high levels of oxygen storage components (OSC) are said to be delivered on and/or within the filter. However, it is not possible from the information provided to determine a weight ratio of OSC:alumina, except in one embodiment, wherein the TWC catalytic material is substantially free of alumina, i.e. the ratio of OSC:alumina is ∞. The filters can have a coated porosity that is substantially the same as its uncoated porosity. The TWC catalytic material can comprise a particle size distribution such that a first set of particles has a first d90 particle size of 7.5 µm or less and a second set of particles has a second d90 particle size of more than 7.5 µm.

WO 2014/125296 discloses a positive ignition engine comprising an exhaust system for a vehicular positive ignition internal combustion engine, which exhaust system comprising a filter for filtering particulate matter from exhaust gas emitted from the vehicular positive ignition internal combustion engine, which filter comprising a porous substrate having inlet surfaces and outlet surfaces, wherein the porous substrate is coated at least in part with a three-way catalyst washcoat comprising a platinum group metal and a plurality of solid particles, wherein the plurality of solid particles comprises at least one base metal oxide and at least one oxygen storage component which is a mixed oxide or composite oxide comprising cerium, wherein the mixed oxide or composite oxide comprising cerium and/or the at least one base metal oxide has a median particle size (D50); less than 1 µm and wherein the platinum group metal is selected from the group consisting of: (a) platinum and rhodium; (b) palladium and rhodium; (c) platinum, palladium and rhodium; (d) palladium only; or (e) rhodium only.

SUMMARY OF THE INVENTION

According to a first aspect there is provided a catalytic wall-flow monolith for use in an emission treatment system, wherein the monolith comprises a porous substrate and a three-way catalyst (TWC), wherein the TWC is distributed substantially throughout the porous substrate and wherein the TWC comprises:

(i) alumina;
(ii) one or more platinum group metals; and
(iii) an oxygen storage component (OSC), wherein the OSC comprises ceria or one or more mixed oxides comprising cerium and is present in a ratio by weight of OSC to alumina of from 65:35 to 85:15.

The present invention will now be further described. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

The present invention relates to a catalytic wall-flow monolith for use in an emission treatment system, such as an automobile exhaust. Wall-flow monoliths are well-known in the art for use in particulate filters. They work by forcing a flow of exhaust gases (including particulate matter) to pass through walls formed of a porous material.

The monolith preferably has a first face and a second face defining a longitudinal direction therebetween. In use, one of the first face and the second face will be the inlet face for exhaust gases and the other will be the outlet face for the treated exhaust gases.

As is conventional for a wall-flow monolith, it has first and second pluralities of channels extending in the longitudinal direction. The first plurality of channels is open at the first face and closed at the second face. The second plurality of channels is open at the second face and closed at the first face. The channels are preferably parallel to each other to provide a constant wall thickness between the channels. As a result, gases entering one of the plurality of channels cannot leave the monolith without diffusing through the channel walls into the other plurality of channels. The channels are closed with the introduction of a sealant material into the open end of a channel. Preferably the number of channels in the first plurality is equal to the number of channels in the second plurality, and each plurality is evenly distributed throughout the monolith.

Preferably the hydraulic channel diameter of the first and second pluralities of channels is 1 to 1.5 mm, defined as four times the flow area divided by the wetted perimeter. The channels may be of a constant width and each plurality of channels may have a uniform channel width. Preferably, however, the plurality of channels that serves as the inlet in use has a greater mean cross-sectional width than the plurality of channels that serves as the outlet. Preferably, the difference is at least 10%. This affords an increased ash storage capacity in the filter, meaning that a lower regeneration frequency can be used. The wetted perimeter of the channels can be measured using known microscopic techniques such as SEM or TEM.

Preferably the mean minimum thickness of the substrate between adjacent channels is from 8 to 20 mil (where a "mil" is $\frac{1}{1000}$ inch) (0.02 to 0.05 cm). This can be measured using known microscopic techniques such as SEM or TEM. Since the channels are preferably parallel and preferably have a constant width, the minimum wall thickness between adjacent channels is preferably constant. As will be appreciated, it is necessary to measure the mean minimum distance to ensure a reproducible measurement. For example, if the channels have a circular cross-section and are closely packed, then there is one clear point when the wall is thinnest between two adjacent channels.

Preferably within a plane orthogonal to the longitudinal direction, the monolith has from 100 to 500 channels per square inch (cpsi), preferably from 200 to 400 cpsi. For example, on the first face, the density of open first channels and closed second channels is from 200 to 400 channels per square inch. The channels can have cross sections that are rectangular, square, circular, oval, triangular, hexagonal, or other polygonal shapes.

In order to facilitate the passage of gases to be treated through the channel walls, the monolith is formed out of a porous substrate. The substrate also acts as a support for holding catalytic material. Suitable materials for forming the porous substrate include ceramic-like materials such as cordierite, silicon carbide, silicon nitride, zirconia, mullite, spodumene, alumina-silica-magnesia or zirconium silicate, or of porous, refractory metal. Wall-flow substrates may also be formed of ceramic fibre composite materials. Preferred wall-flow substrates are formed from cordierite and silicon carbide. Such materials are able to withstand the environment, particularly high temperatures, encountered in treating the exhaust streams and can be made sufficiently porous. Such materials and their use in the manufacture of porous monolith substrates is well known in the art.

Preferably the porous substrate prior to coating has a porosity of 30-70%, such as 40-65%, most preferably >50% such as >55% e.g. 55-70% Suitable techniques for determining porosity are known in the art and include mercury porosimetry and x-ray tomography.

Preferably the porous substrate can comprise a mean pore size in the range of 10-30 µm, such as 13-25 µm, 18-23 µm, 15-25 µm, 16-21 µm or 13-23 µm. Suitable techniques for determining mean pore size of a porous substrate are known in the art and include mercury porosimetry.

The present invention relates to exhaust systems and components suitable for use in conjunction with gasoline engines, particularly gasoline direct injection (GDI) engines but also predominantly stoichiometrically operated gasoline engines to capture particulates in addition to treating gaseous emissions such as hydrocarbons, nitrogen oxides, and carbon monoxides. In particular, it relates to exhaust treatment systems comprising a three-way catalyst (TWC) and a particulate trap. That is, the particulate trap is provided with TWC catalyst compositions therein.

The monolith comprises a three-way catalyst (TWC). TWCs are well known in the art. The TWC is distributed substantially throughout the porous substrate.

TWC compositions are generally provided in washcoats. Layered TWC catalysts can have different compositions for different layers. Traditionally, TWC catalysts can comprise washcoat layers having loadings of up to 2.5 g/in$^3$ and total loadings of 5 g/in$^3$ or more. For use with particulate traps, due to backpressure constraints, TWC catalyst washcoat layer are preferably from 1 g/in$^3$ to 0.1 g/in$^3$, preferably from 0.7 g/in$^3$ to 0.25 g/in$^3$, and most preferred from 0.6 g/in$^3$ to 0.5 g/in$^3$. This provides sufficient catalyst activity to oxidize carbon dioxide and hydrocarbons, as well as reduce nitrogen oxides ($NO_x$).

The application may be characterised as "on wall" application or "in wall" application. The former is characterised by the formation of a coating layer on a surface of a channel. The latter is characterised by the infiltration of catalytic material into the pores within the porous material. The techniques for "in wall" or "on wall" application can depend on the viscosity of the material applied, the application technique (spraying or dipping, for example) and the presence of different solvents. Such application techniques are known in the art. The viscosity of the washcoat is influenced, for example, by its solids content. It is also influenced by the particle size distribution of the washcoat—a relatively flat distribution will give a different viscosity to a finely milled washcoat with a sharp peak in its particle size distribution— and rheology modifiers such as guar gums and other gums. Suitable coating methods are described in WO 2011/080525, WO 99/047260, WO 2014/195685 and WO 2015/145122, which are incorporated herein by reference.

The monolith described herein includes catalytic material distributed throughout the porous substrate. This material is included in the pores of the substrate, such as by infiltration with a washcoating method. This coats the pores and holds catalytic material therein, while maintaining sufficient porosity for the gases to penetrate through the channel walls.

At least one inventor has now discovered, very surprisingly, that inter alia by adjusting a D90 of the TWC washcoat components, and using appropriate coating methods, it is possible to obtain on-wall wedge shaped coating profiles, wherein an amount by weight of the one or more platinum group metal, per unit volume of an on-wall coating present on channel wall surfaces of a first plurality of channels varies continually along a longitudinal direction of porous substrate; and/or a layer thickness of the on-wall coating present on channel wall surfaces of the first plurality of channels varies continually along the longitudinal direction. Such coating arrangements can improve TWC activity and/or reduce backpressure (also referred to as pressure drop) across the filter.

Accordingly, in the first aspect of the invention, (a) an amount by weight of the one or more platinum group metal, per unit volume of an on-wall coating present on channel wall surfaces of the first plurality of channels can vary continually along the longitudinal direction; and/or (b) a layer thickness of an on-wall coating—or substantially on-wall coating—present on channel wall surfaces of the first plurality of channels can vary continually along the longitudinal direction.

The porous substrate has a first face and a second face defining a longitudinal direction therebetween and at least a first plurality of channels extending in the longitudinal direction and providing a first plurality of inner surfaces. In use, one of the first face and the second face will be the inlet face for exhaust gases and the other will be the outlet face for the treated exhaust gases. Preferred is a wall flow filter, wherein the monolith further comprises a second plurality of channels extending in the longitudinal direction, wherein the first plurality of channels is open at the first face and closed at the second face and provides a first plurality of inner surfaces, and wherein the second plurality of channels is open at the second face and closed at the first face and provides a second plurality of inner surfaces, and wherein the coating is optionally further provided on the second plurality of inner surfaces. Wall-flow monoliths are well-known in the art for use in particulate filters. They work by forcing a flow of exhaust gases (including particulate matter) to pass through walls formed of a porous material.

Any reference to "on-wall" or "substantially on-wall" as used herein with reference to coating refers to a wall-flow filter substrate where a liquid comprising a catalytic material has been coated onto a surface of the wall (i.e. of the filter substrate), such that >50% of the catalyst component is disposed on a surface of the wall, particularly >60% of the catalyst component, preferably >70% of the catalyst component (e.g. >80% of the catalyst component), and more preferably >90% of the catalyst component. When the liquid comprises a plurality of catalyst components, then typically >50% of all of the catalyst components are disposed on a surface of the wall, particularly >60% of all of the catalyst components, preferably >70% of all of the catalyst components (e.g. >80% of all of the catalyst components), and more preferably >90% of all of the catalyst components.

Any reference to "in-wall" or "substantially in-wall" as used herein with reference to coating refers to a wall-flow filter substrate where a liquid comprising a catalytic material has been coated onto a surface of the wall (i.e. of the filter substrate), such that >50% of the catalyst component is disposed within the wall, particularly >60% of the catalyst component, preferably >70% of the catalyst component (e.g. >80% of the catalyst component), and more preferably >90% of the catalyst component. When the liquid comprises a plurality of catalyst components, then typically >50% of all of the catalyst components are disposed within the wall, particularly >60% of all of the catalyst components, preferably >70% of all of the catalyst components (e.g. >80% of all of the catalyst components), and more preferably >90% of all of the catalyst components. For any value of in-wall or substantially in-wall coating less than 100%, the remainder will be visible using appropriate techniques, e.g. SEM, as an on-wall coating and as such will have an on-wall coating thickness. Where an in-wall coating is visible at a channel wall surface, it will usually be seen at a surface of one or other or both of the first or second channel wall surfaces. It will be understood, however, that the intention is to insert the coating in-wall and for this purpose the coating is arranged so that it is preferentially received as entirely as possible in-wall. Parameters that can promote in-wall location include selection of an appropriate D90 by milling or selection of sol components, preferably to less than 5 μm, and appropriate selection of catalyst loading so that the in-wall porosity does not become overfilled, thus encouraging overspill of in-wall coating so that it lies on-wall.

A liquid catalytic washcoat D90 (by volume) can have a particle size (i.e. a primary particle size) greater than 0.4 µm. Preferably, at least 90% of the particles have a particle size greater than 0.5 µm, more preferably greater than 1 µm, and even more preferably greater than 2 µm.

At least 90% of the particles in the liquid can have a particle size (i.e. a primary particle size) less than 25 µm. Preferably, at least 90% of the particles have a particle size less than 20 µm, more preferably less than 15 µm, and even more preferably less than 10 µm.

Particle size measurements are obtained by Laser Diffraction Particle Size Analysis using a Malvern Mastersizer 2000, which is a volume-based technique (i.e. D(v, 0.1), D(v, 0.5), D(v, 0.9) and D(v, 0.98) may also be referred to as DV10, DV50, DV90 and DV98 respectively (or D10, D50, D90 and D98 respectively) and applies a mathematical Mie theory model to determine a particle size distribution. Diluted washcoat samples were prepared by sonication in distilled water without surfactant for 30 seconds at 35 watts.

The amount by weight of the first platinum group metal and/or the amount by weight of second platinum group metal, per unit area of the coating, can vary continually along the longitudinal direction. This could be achieved by varying the density of the coating, or by allowing a solution of platinum group metals to wick into a layer of refractory metal oxide coated on the wall-flow monolith filter but it is more readily achieved by varying the coating thickness in the longitudinal direction.

Preferably the amount by weight of the first and/or second platinum group metals in the coating can vary linearly within the coating along the longitudinal direction. That is, the gradient of the change in amount remains constant.

In a catalytic monolith filter according to the invention, a maximum on-wall coating thickness of catalytic material present on the first plurality of surfaces in the longitudinal direction can be up to 150 microns. Wall-flow filter channels typically include at least one side, e.g. they have a square cross-section or a hexagonal cross section. Where the channels have a cross-sectional shape having at least one flat side, according to the invention, the thickness of the on-wall coating is measured, e.g. by SEM, at a mid-point between corners in the cross section shape.

Preferably the coating has a thickness of from 10 to 150 microns, more preferably from 50 to 100 microns.

Preferably the thickness of at least one of the first and second layers varies along the longitudinal direction by from 10 to 100 microns, more preferably from 20 to 50 microns. That is, the layer may increase from 0 to 50 microns along the length of the first channel.

Preferably, a maximum weight of the one or more platinum group metal and/or a maximum layer thickness present on channel wall surfaces of the first plurality of channels is at the open end of the first plurality of channels. The term "wedge-shaped profile" is used herein interchangeably with this definition.

Preferably, an on-wall coating comprising catalytic material having a layer thickness is further provided on the wall surfaces of the second plurality of channels,
  wherein an on-wall coating comprising catalytic material having a layer thickness is present on the channel wall surfaces of the second plurality of channels,
  wherein the catalytic material on channel wall surfaces of the second plurality of channels comprises one or more platinum group metal selected from the group consisting of (i) rhodium (Rh) only; (ii) palladium (Pd) only; (iii) platinum (Pt) and rhodium (Rh); (iv) palladium (Pd) and rhodium (Rh); and (v) platinum (Pt), palladium (Pd) and rhodium (Rh) and a refractory metal oxide support, and wherein:
  (i) an amount by weight of the one or more platinum group metal, per unit volume of the on-wall coating present on channel wall surfaces of the second plurality of channels varies continually along the longitudinal direction; and/or
  (ii) the layer thickness of the on-wall coating present on channel wall surfaces of the second plurality of channels varies continually along the longitudinal direction.

In a further alternative described in Example 4, by adjusting the D90 of at least one washcoat composition applied via the first plurality of channels or the second plurality of channels, it is possible to obtain a product comprising a substantially in-wall coating and a second, on-wall coating comprising catalytic material having a layer thickness is present in the first plurality of channels in addition to the first on-wall coating of the first plurality of channels, wherein the catalytic material of the second on-wall coating of the first plurality of channels and the substantially in-wall coating comprises one or more of platinum group metal selected from the group consisting of (i) rhodium (Rh) only; (ii) palladium (Pd) only; (iii) platinum (Pt) and rhodium (Rh); (iv) palladium (Pd) and rhodium (Rh); and (v) platinum (Pt), palladium (Pd) and rhodium (Rh) and a refractory metal oxide support, wherein, in the second on-wall coating of the first plurality of channels in addition to the first on-wall coating of the first plurality of channels:
  (i) an amount by weight of the one or more platinum group metal, per unit volume of the on-wall coating present on channel wall surfaces of the first plurality of channels varies continually along the longitudinal direction; and/or
  (ii) the layer thickness of the second on-wall coating present on channel wall surfaces of the first plurality of channels varies continually along the longitudinal direction.

Alternatively, channel walls defined by the channel wall surfaces of the first plurality of channels and the channel wall surfaces of the second plurality of channels are porous and comprise a second, in-wall—or substantially in-wall—coating comprising catalytic material, wherein the in-wall catalytic material comprises one or more platinum group metal selected from the group consisting of (i) rhodium (Rh) only; (ii) palladium (Pd) only; (iii) platinum (Pt) and rhodium (Rh); (iv) palladium (Pd) and rhodium (Rh); and (v) platinum (Pt), palladium (Pd) and rhodium (Rh) and a refractory metal oxide support, and wherein the in-wall—or substantially in-wall—coating comprising catalytic material is the same as or is different from the catalytic material comprised in the on-wall coating present on channel wall surfaces of the first plurality of channels.

The maximum weight of the one or more platinum group metal and/or a maximum layer thickness present on channel wall surfaces of the second plurality of channels is preferably at the open end of the second plurality of channels. The maximum weight of the one or more platinum group metal and/or maximum layer thickness present in the second on-wall coating of the first plurality of channels is preferably at the closed end of the first plurality of channels.

The TWC comprises alumina, preferably gamma-alumina. This is an advantageous carrier material since it has a high surface area and is a refractory metal oxide. In other words, the alumina serves as a refractory support material.

This lends the filter good thermal capacity which is required for the high-temperature conditions encountered.

The TWC also comprises one or more platinum group metals (e.g., platinum, palladium, rhodium, rhenium and iridium). These exhibit good activity and long life.

Preferably the one or more platinum group metals is selected from Pt, Pd and Rh, or combinations of two or more thereof. The platinum group metals serve to catalyse the reactions required to remediate the exhaust gases.

Preferably the platinum group metal is Pt, Pd and Rh; Pd and Rh; or Pd only; or Rh only.

$NO_x$ reduction is most effective in the absence of $O_2$, whereas the abatement of CO and hydrocarbons requires $O_2$. In order to convert all three components, the exhaust gas entering the TWC must be close to the "stoichiometric point" (14.7:1 air-to-fuel (AFR) mass ratio). The air-fuel equivalence ration, $\lambda$ (lambda), is the ratio of actual AFR to stoichiometry for a given air/fuel mixture. $\lambda=1.0$ at stoichiometry, rich mixtures (mixtures generating reducing species such as unburned hydrocarbons (HCs) and CO in excess of oxidising species) $\lambda<1.0$, i.e. an AFR of <14.7:1 and lean mixtures $\lambda>1$, i.e. an AFR>14.7:1. There is only a narrow window where simultaneous catalytic conversion of all three of NOx, CO and HC occurs.

While oxygen sensors provide feedback to keep the AFR within the desired window as much as possible, the feedback causes perturbation about the stoichiometric point, meaning that the catalyst will alternately see slightly rich and slightly lean conditions. During dynamic driving, e.g. hard accelerations can enrich the exhaust gas before the feedback mechanism can regain control. Similarly, fuel cuts when a driver lifts off the accelerator can result in excessively lean exhaust gas. Therefore, in order to achieve as complete three-way conversion activity as possible, when operating rich, there is a need for the TWC to provide a small amount of $O_2$ to consume the unreacted CO and HC. Conversely, when the exhaust becomes slightly oxidising, the excess $O_2$ needs to be consumed.

Accordingly, the TWC also comprises an oxygen storage component (OSC). This is an entity that has multi-valence state and can actively react with oxidants such as oxygen or nitrous oxides under oxidative conditions, or reacts with reductants such as carbon monoxide (CO) or hydrogen under reducing conditions. Examples of suitable oxygen storage components include ceria, which is preferably stabilised with one or more additional oxides in a mixed oxide or composite oxide therewith. Praseodymia can also be included as an OSC. Delivery of an OSC to the washcoat layer can be achieved by the use of, for example, mixed oxides. For example, ceria can be delivered by a mixed oxide of cerium and zirconium, and/or a mixed oxide of cerium, zirconium, and neodymium. For example, praseodymia can be delivered by a mixed oxide of praseodymium and zirconium, and/or a mixed oxide of praseodymium, cerium, lanthanum, yttrium, zirconium, and neodymium.

The OSC comprises or consists of one or more mixed oxides. Preferably the OSC comprises a ceria and zirconia mixed oxide optionally including one or more rare earth element.

The mixed oxide comprising ceria and zirconia can have a pyrochlore structure, i.e. $A_2B_2O_7$, or a similar structure such as disordered fluorite ($[AB]_2O_7$) or so-called delta ($\delta$)-phase ($A_4B_3O_{12}$), wherein "A" represents a trivalent cation and "B" represents a tetravalent cation. Such materials have a relatively low surface area (e.g. less than 15 $m^2/g$) and a relatively high bulk density, but good oxygen storage and release properties. The use of high bulk density OSC components can result in a reduced backpressure filter according to the invention compared with more typical OSC ceria-zirconia mixed oxides having a similar oxygen storage/release activity.

At least one inventor has found that a praseodymium-doped mixed oxide of cerium and zirconium promotes soot oxidation in the catalytic material in the first plurality of channels. Therefore, preferably where the first plurality of channels includes OSC, e.g. in a system for a gasoline direct injection engine generating particulate matter, the first plurality of channels comprises a OSC comprising praseodymium, preferably in an on wall coating to contact gasoline particulate matter. In this regard, the praseodymium can be present at 2-10 wt % based on the total content of the mixed oxide.

Without wishing to be bound by any theory, from the experimental results presented in the Examples hereinbelow, inventors believe that the soot combustion promotion effect of the praseodymium is not related to a direct catalytic effect, e.g. praseodymium contacting the soot. Instead, inventors believe that the effect is related to a promotion of soot oxidation by the cerium component. In particular, inventors suggest that the observed improved soot combustion effect is related to a metastabilising effect of praseodymium on the cubic fluorite structure of the ceria-zirconia solid solution and promotion of dissociated oxygen anions diffused in the bulk of the solid through the oxygen vacancies and associated spillover oxygen between the $4^+/3^+$ redox states of the cerium.

The ratio by weight of OSC to alumina is from 65:35 to 85:15, more preferably from 70:30 to 80:20 and most preferably about 75:25. Whereas it is conventional to provide the alumina and the OSC in a roughly 50:50 ratio when the TWC is provided as a separate unit, the inventors have found that when providing a combined particulate filter and catalytic treatment unit, the ratio of about 75:25 provided far better process efficiency. In particular, the additional oxygen storage capacity allows the device to operate across a range of conditions from start-up to full temperature, without having insufficient thermal mass to function or inability to adhere to the substrate. As a result of the improved oxygen storage capacity, NOx conversion under most conditions is improved. It has been found that above an upper limit of 85:15 OSC:alumina, the coating is too thermally unstable to function effectively.

Preferably the TWC is homogenous throughout the porous substrate. That is, the relative concentration of the components within the TWC are preferably constant throughout the pores of the porous substrate.

The TWC is preferably further present as a coating on a surface of at least one of the first and second plurality of channels. Preferably the TWC is coated on both the inlet side and the outlet side of the particulate trap.

According to a further aspect there is provided an emission treatment system for treating a flow of a combustion exhaust gas, the system comprising the catalytic wall-flow monolith as disclosed herein.

The exhaust system can comprise additional components, such as a TWC composition applied to a honeycomb monolith (flow through) substrate and disposed either upstream or downstream of the catalytic wall flow monolith filter according to the invention. In the upstream or downstream TWC, unburned gaseous and non-volatile hydrocarbons (volatile organic fraction) and carbon monoxide are largely combusted to form carbon dioxide and water. In addition, nitrogen oxides are reduced to form nitrogen and water. Removal of substantial proportions of the VOF using the oxidation catalyst, in particular, helps to prevent too great a deposition of particulate matter (i.e., clogging) on the downstream filter according to the present invention.

As desired, the exhaust system can also include additional components. For example, in exhaust systems applicable particularly to lean-burn engines, a NOx trap can be disposed either upstream of the filter according to the invention instead of or in addition to the upstream TWC composition applied to a honeycomb monolith (flow through) substrate. A NOx trap, also known as a $NO_x$ absorber catalysts (NACs), are known e.g. from U.S. Pat. No. 5,473,887 and are designed to adsorb nitrogen oxides ($NO_x$) from lean (oxygen rich) exhaust gas (lambda >1) during lean running mode operation and to desorb the $NO_x$ when the oxygen concentration in the exhaust gas is decreased (stoichiometric or rich running modes). Desorbed $NO_x$ may be reduced to $N_2$ with a suitable reductant, e.g. gasoline fuel, promoted by a catalyst component, such as rhodium or ceria, of the NAC itself or located downstream of the NAC.

Downstream of the NAC, a SCR catalyst can be disposed to receive the outlet of the NAC and to provide further emissions treatment of any ammonia generated by the NAC with a selective catalytic reduction catalyst for reducing oxides of nitrogen to form nitrogen and water using the ammonia as reductant. Suitable SCR catalysts include molecular sieves, particularly aluminosilicate zeolites, preferably having the CHA, AEI, AFX or BEA framework type according to the International Zeolite Association, promoted e.g. by ion exchange with copper and/or iron or oxides thereof.

The invention can also comprise a positive ignition engine as described herein comprising the exhaust system according to the second aspect of the invention.

Additionally, the present invention can comprise a vehicle, such as a passenger vehicle, comprising an engine according to the invention.

According to a further aspect there is provided a method for the manufacture of a catalytic wall-flow monolith, comprising:

providing a porous substrate having a first face and a second face defining a longitudinal direction therebetween and first and second pluralities of channels extending in the longitudinal direction, wherein the first plurality of channels is open at the first face and closed at the second face, and wherein the second plurality of channels is open at the second face and closed at the first face;

infiltrating the porous substrate with a washcoat containing a catalytic material; and calcining the catalytic material within the porous substrate, wherein the catalytic material comprises:
(i) alumina;
(ii) one or more platinum group metals; and
(iii) an oxygen storage component (OSC),
wherein the OSC comprises ceria or one or more mixed oxides comprising cerium and is present in a ratio by weight of OSC to alumina of from 65:35 to 85:15.

Preferably the catalytic wall-flow monolith manufactured according to the foregoing method is the monolith as described herein. That is, all features of the first aspect may be freely combined with the further aspects described herein.

Preferably preparation of the washcoat before infiltrating the porous substrate includes mixing Pt, Pd and/or Rh with alumina and calcining to form a first portion of the catalytic material. The inventors have found that this treatment serves to pre-fix the platinum group metal.

Preferably preparation of the washcoat before infiltrating the porous substrate includes mixing Rh with the OSC and calcining to form a second portion of the catalytic material. The inventors have found that this treatment similarly serves to pre-fix the platinum group metal. This prevents the deactivation of the rhodium which can be observed when it is contacted with alumina.

The present invention permits the provision of the TWC in a single application step, rather than the multiple layers of prior art methods. This therefore avoids process complexity and high back pressures.

Catalytic wall-flow monoliths having a wedge-shaped on-wall profile can be obtained in an adaptation of the method disclosed. UK patent publication no. 2524662 (the entire contents of which are incorporated herein by reference) discloses a method of coating a filter substrate comprising a plurality of channels and comprising the steps of (a) introducing a pre-determined amount of liquid into a containment means at an upper end of the filter substrate; and (b) draining the liquid from the containment means into the filter substrate. The method is suitable for forming on-wall coatings such as membrane type coatings on the surface of the channels walls of the substrate.

In the method disclosed in UK patent publication no. 2524662, a relatively low viscosity is used and preferably no thickener is added. For example, it is preferable in the method that the liquid has a viscosity from 5 to 100 cP, such as 10 to 100 cP, particularly 20 to 90 cP, preferably 25 to 80 cP, and even more preferably 35 to 65 cP (as measured at 20° C. on a Brookfield RV DVII+ Extra Pro viscometer using a SC4-27 spindle at 50 rpm spindle speed). The liquid has a viscosity that allows the liquid to gradually drain under gravity into the filter substrate.

Generally, the vacuum is from −0.5 to −50 kPa (below atmospheric pressure), particularly from −1 to −30 kPa, and preferably −5 to −20 kPa (e.g. the vacuum applied to the filter substrate). The vacuum may be continuously applied for 0.25 to 15 seconds, such as 0.5 to 35 seconds, preferably 1 to 7.5 seconds (e.g. 2 to 5 seconds). In general, high vacuum strengths and/or longer vacuum durations result in a larger proportion of in-wall coating.

At least one inventor has found that it is possible to achieve a layer thickness of the on-wall coating—or substantially on-wall coating—that varies continually along the longitudinal direction by using a higher viscosity liquid i.e. >100 cP slurry or washcoat. This arrangement has significant advantages as shown in the accompanying Examples.

According to a further aspect, the invention provides a method of treating a combustion exhaust gas from a positive ignition internal combustion engine containing oxides of nitrogen ($NO_x$), carbon monoxide (CO) unburned hydrocarbon fuel (HC) and particulate matter (PM), which method comprising contacting the exhaust gas with a catalytic wall flow filter according to the first aspect of the invention.

BRIEF DESCRIPTION OF THE DRAWINGS

The invention will now be described in relation to the following non-limiting figures, in which.

DETAILED DESCRIPTION OF THE INVENTION

Figure 1A:
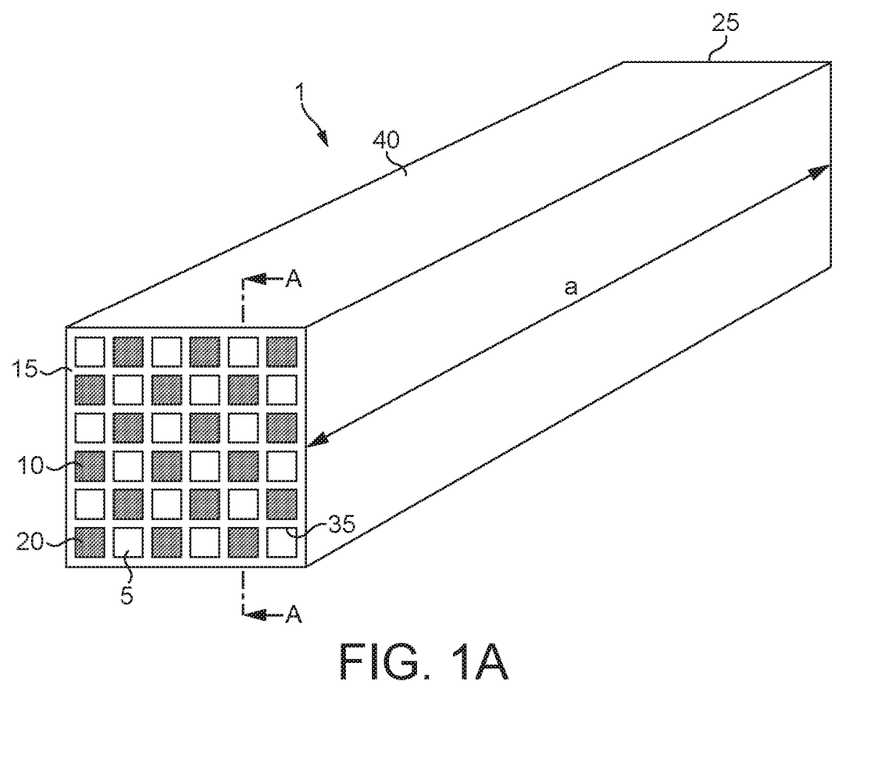
FIG. 1A is a perspective view that schematically shows a wall flow monolith filter 1 according to the present invention.
Figure 1B:
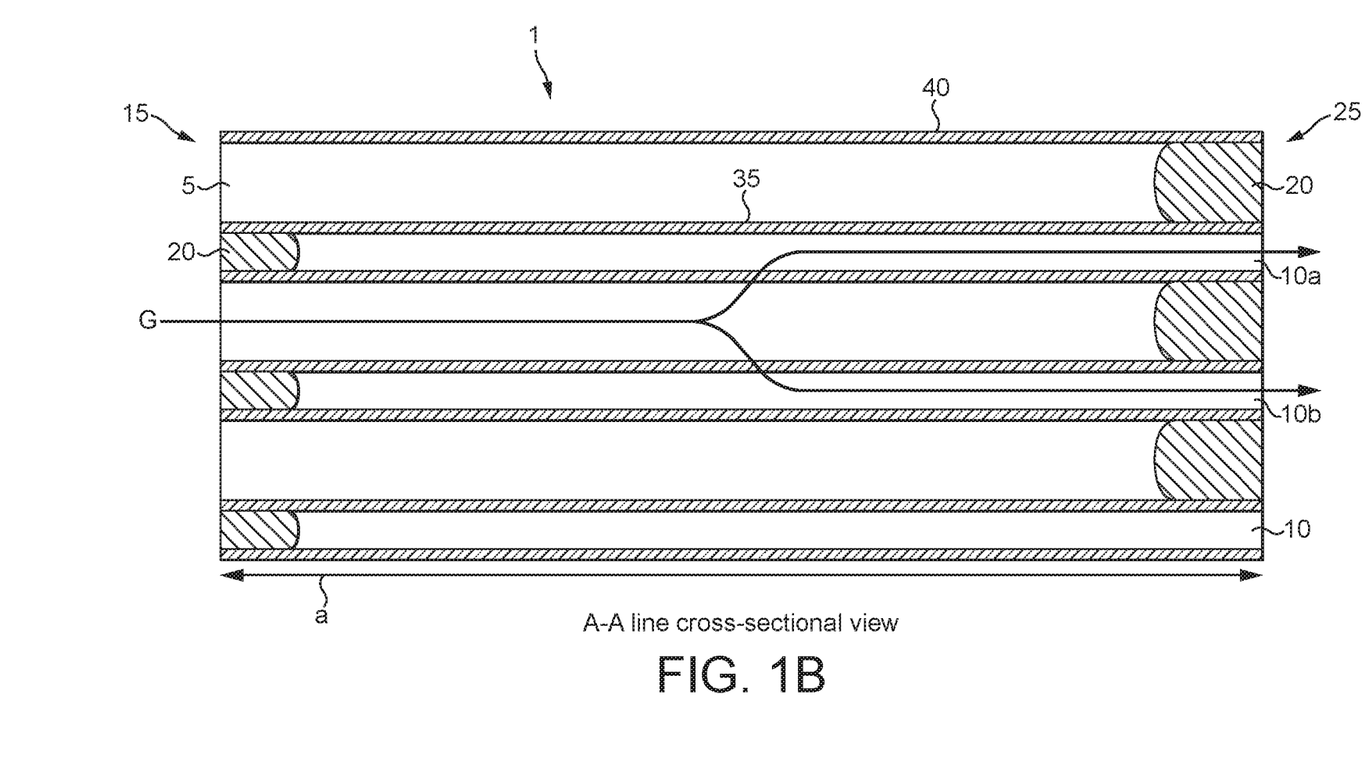
FIG. 1B is an A-A line cross-sectional view of the wall flow monolith filter 1 shown in FIG. 1A.

A wall flow monolith 1 according to the present invention is shown in FIG. 1A and FIG. 1B. It includes a large number of channels arranged in parallel with each other in the longitudinal direction (shown by a double-sided arrow "a" in FIG. 1A) of the monolith 1. The large number of channels includes a first subset of channels 5 and a second subset of channels 10.

The channels are depicted such that the second subset of channels 10 is narrower than the first subset of channels 5. This has been found to provide an increased ash/soot storage capacity in the filter. However, the channels may alternatively be substantially the same size.

The first subset of channels 5 is open at an end portion on a first end face 15 of the wall flow monolith 1 and is sealed with a sealing material 20 at an end portion on a second end face 25.

On the other hand, the second subset of channels 10 is open at an end portion on the second end face 25 of the wall flow monolith 1 and is sealed with a sealing material 20 at an end portion on the first end face 15.

The wall flow monolith 1 is provided with a catalytic material within pores of the channels walls 35. This may be provided with a washcoat application method, as is known in the art and is discussed elsewhere in the specification.

Therefore, when the wall flow monolith is used in an exhaust system, exhaust gases G (in FIG. 1B "G" indicates exhaust gases and the arrow indicates a flowing direction of exhaust gases) introduced to the first subset of channels 5 will pass through the channel wall 35 interposed between the channel 5a and the channels 10a and 10b, and then flow out from the monolith 1. Accordingly, particulate matter in exhaust gases is captured by the channel wall 35.

The catalyst supported in the channel wall 35 of the monolith 1 functions as a catalyst for treating the exhaust fumes.

Figure 2:
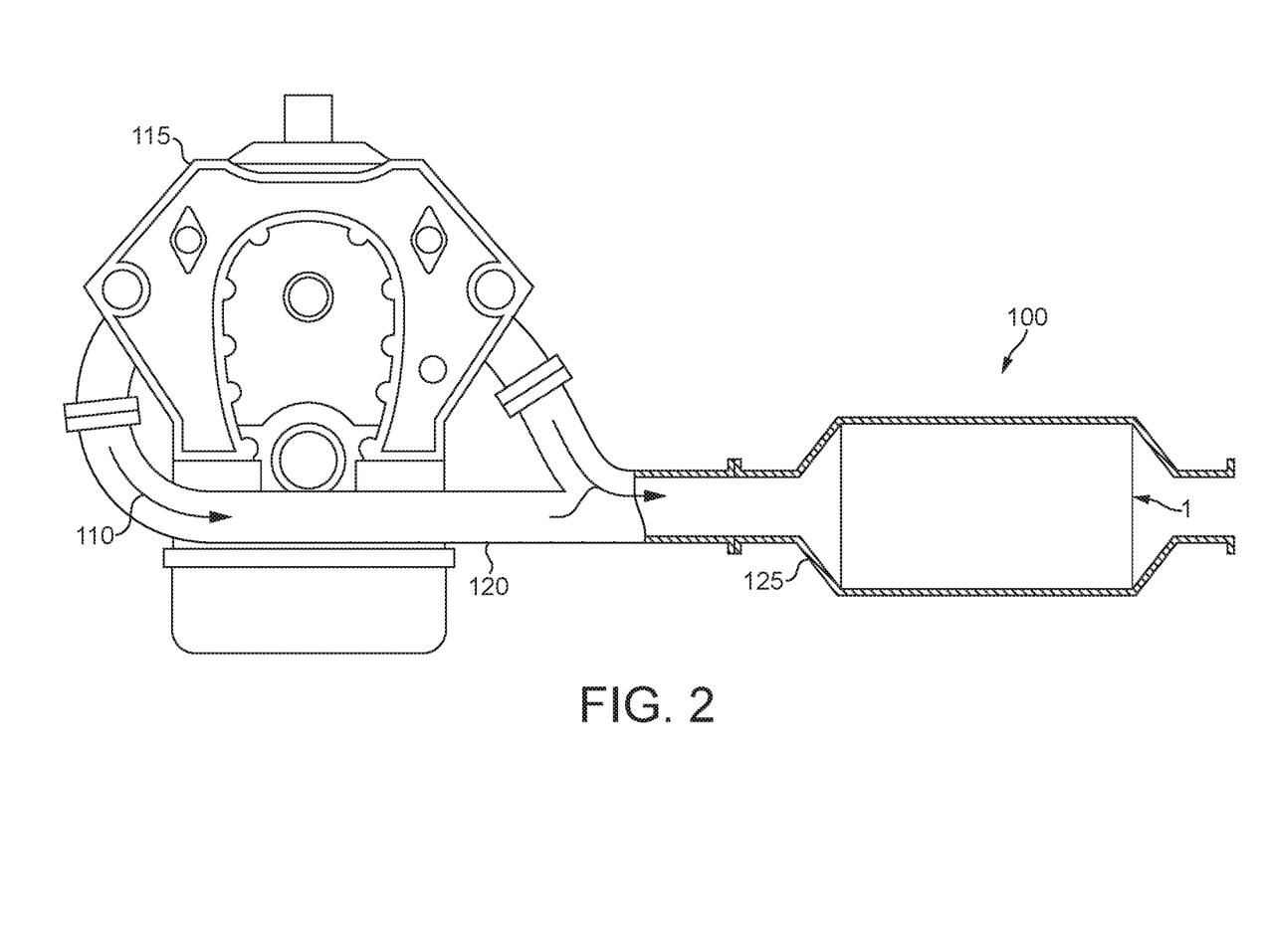
FIG. 2 shows a schematic diagram of an exhaust gas treatment system for a gasoline direct injection engine.

In the embodiment of the exhaust gas treatment system 100 shown in FIG. 2 the flow of exhaust gas 110 passes through the wall flow monolith 1. The exhaust gas 110 is passed from the engine 115 through ducting 120 to the exhaust system 125.

It should be noted that the wall flow monolith is described herein as a single component. Nonetheless, when forming an emission treatment system, the monolith used may be formed by adhering together a plurality of channels or by adhering together a plurality of smaller monoliths as described herein. Such techniques are well known in the art, as well as suitable casings and configurations of the emission treatment system.

The catalytic wall-flow monolith will now be described further in relation to the following non-limiting examples.

EXAMPLES

Example 1 (Comparative)

Four wall-flow filters (4×5" and 600/4 cell density) were coated with TWCs having a platinum group metal (PGM) composition of 40 [g/ft$^{-3}$]/0:9:1 [Pt:Pd:Rh weight ratio]. Each TWC comprised a different weight ratio of $Al_2O_3$ to $CeZrO_4$.

The filters were fitted in the exhaust system of a bench mounted laboratory V8 Land Rover gasoline turbo direct injection (GTDI) engine and aged using a proprietary test methodology involving 10 seconds of fuel cut (to simulate a driver lifting off the accelerator pedal, producing a "spike" of lean exhaust gas) followed by 180 seconds at lambda 1 (perturbated stoichiometric operation at 630° C. inlet temperature with 5% Lambda amplitude and 5 seconds switch time) repeated for 80 hours.

A lambda sweep test was then conducted on the aged samples using a 2.0 litre GTDI (gasoline turbo direct injection) laboratory bench-mounted engine certificated to the Euro 5 emission standard at 450° C. filter inlet temperature and 130 kg/h mass flow, 4% lambda amplitude and lambda set point of 0.991 to 1.01. A higher value indicates better conversion activity. The results are shown in the Table below. It can be seen that the filter according to the invention has a higher CO/NOx Cross-Over Point, i.e. is more active than the conventional filter.

The results were as follows:

| | $Al_2O_3$:$CeZrO_4$ wt ratio | | | |
|---|---|---|---|---|
| | 1:1 | 1:2 | 1:3 | 1:4 |
| Vehicle NOx Emissions (g/km) | 0.049 | 0.052 | 0.053 | 0.057 |
| Relative NOx Emissions | 100.0% | 106.1% | 108.2% | 116.3% |
| NOx Conversion at lambda 1 (i.e. stoichiometric point) | 97.1% | 85.4% | 85.5% | 89.8% |

As can be seen from the table, increasing the $CeZrO_4$:$Al_2O_3$ ratio above 1:1 was found to be detrimental to the NOx conversion ability of the coated through-flow monolith.

Example 2

Four wall-flow filters (4.66×4.5" and 300/8 cell density) were coated with TWCs having PGM 60/0.57:3. Each TWC comprised a different weight ratio of $Al_2O_3$ to $CeZrO_4$. The coated filters were calcined and aged (Hydrothermal, 1100° C. in air with 10% $H_2O$ added, 5 h).

Using a 1.41 GTDI test engine, the NOx emissions were measured based on a standard engine test. The results were as follows:

| | $Al_2O_3$:$CeZrO_4$ wt ratio | | | |
|---|---|---|---|---|
| | 1:1 | 1:2 | 1:3 | 2:1 |
| Vehicle NOx Emissions (g/km) | 0.058 | 0.046 | 0.04 | 0.054 |
| Relative NOx Emissions | 145.0% | 115.0% | 100.0% | 135.0% |

As can be seen from the table, as the $CeZrO_4$:$Al_2O_3$ wt ratio increased from 1:2 to 3:1, the relative NOx emissions decreased.

Example 3

Three wall-flow filters (4.66×4.5" and 300/8 cell density) were coated with TWCs having PGM 22/0:20:2. Each TWC comprised a different weight ratio of $Al_2O_3$ to $CeZrO_4$. The coated filters were calcined and aged as in Example 2.

Using a 2.0l GTDI Engine Bench test engine, the NOx emissions were measured based on a standard engine test. The results were as follows:

|  | $Al_2O_3:CeZrO_4$ wt ratio | | |
| --- | --- | --- | --- |
|  | 1:3 | 1:4 | 1:5 |
| NOx conversion at lambda 1 | 44.8 | 46.05 | 44.78 |

To coat the wall flow filters with the TWC composition, porous substrates are immersed vertically in a portion of the catalyst slurry such that the top of the substrate is located just above the surface of the slurry. In this manner slurry contacts the inlet face of each honeycomb wall, but is prevented from contacting the outlet face of each wall. The sample is left in the slurry for about 30 seconds. The filter is removed from the slurry, and excess slurry is removed from the wall flow filter first by allowing it to drain from the channels, then by blowing with compressed air (against the direction of slurry penetration), and then by pulling a vacuum from the direction of slurry penetration. By using this technique, the catalyst slurry permeates the walls of the filter, yet the pores are not occluded to the extent that undue back pressure will build up in the finished filter. As used herein, the term "permeate" when used to describe the dispersion of the catalyst slurry on the filter, means that the catalyst composition is dispersed throughout the wall of the filter.

The coated filters are dried typically at about 100° C. and calcined at a higher temperature (e.g., 300 to 450° C. and up to 550° C.). After calcining, the catalyst loading can be determined through calculation of the coated and uncoated weights of the filter. As will be apparent to those of skill in the art, the catalyst, loading can be modified by altering the solids content of the coating slurry. Alternatively, repeated immersions of the filter in the coating slurry can be conducted, followed by removal of the excess slurry as described above.

Example 4—Soot Combustion Tests

Two ceria-zirconia mixed oxides each doped with rare earth elements and having the composition shown in the Table below were tested for their soot combustion activity using a CATLAB-PCS combined microreactor and mass spectrometer laboratory apparatus (Hiden Analytical). A cordierite sample was tested as a control. The ceria-zirconia mixed oxides and the cordierite control were pre-fired at 500° C. for 2 hours.

Soot was collected from the engine of a European common rail light-duty diesel 2.2 litre capacity engine, which was certified to meet Euro IV emission standards. The exhaust system included a commercially available soot filter comprising an aluminium titanate wallflow filter. Soot was collected on the filter and the soot was removed from the filter by directing compressed air from a gun through the outlet channels of the filter.

To prepare the samples, 85 mg of each sample or cordierite was mixed with 15 mg of the soot using a pestle and mortar until the mix was a uniform colour, free of lumps and streaks. Periodically the cake was scraped from the wall of the mortar. No pre-treatment was carried out. 0.1 g of each sample/soot mixture (nominally containing 15 mg soot) was placed into a CATLAB microreactor tube. It was heated in 13% $O_2$/He with a temperature ramp rate of 10° C./min. The outlet gas was monitored by mass spectrometer.

Three samples of soot ground with fine cordierite (<250 µm) taken from the same batch of grinding, were run to assess the repeatability of the method. Very good repeatability was obtained for soot oxidation peak position and the shape of the evolved $CO_2$ profile. The reproducibility of the test methodology was investigated also by having two different scientists prepare the same mixed soot/ceria-zirconia mixed oxide material. Although differences in oxidation at higher temperatures were observed, possibly because of looser contact between the soot and the mixed oxide or unpromoted soot oxidation at 600° C., the main oxidation peak for both mixtures was sharp, well defined and at an identical temperature. Therefore, the method is reproducible and the main peak temperature is representative of the sample oxidation activity.

The results for soot oxidation are set out in the Table below, from which it can be seen that Sample B comprising 5 wt % $Pr_6O_{11}$ has a 2.5% lower soot oxidation temperature than Sample A, despite Sample A having a similar composition to Sample B. Inventors conclude that the inclusion of Sample A in an on-wall coating on inlet channels of a filter, thereby increasing contact between the soot and the coating will beneficially promote removal of soot at lower exhaust gas temperatures.

TABLE

| Sample | $CeO_2$ % | $ZrO_2$ % | $La_2O_3$ % | $Nd_2O_3$ % | $Pr_6O_{11}$ % | Soot Oxidation Temperature (° C.) |
| --- | --- | --- | --- | --- | --- | --- |
| A | 45 | 48.5 | 1.5 | 5 | 0 | 352 |
| B | 45 | 45 | 0 | 5 | 5 | 343 |
| Control | n/a | n/a | n/a | n/a | n/a | ≈600 |

Example 5

A wall-flow filter was prepared based on a substrate having dimensions of 4.66 inches (diameter)×6 inches (length), a cell density/wall thickness 300/8 (cells per square inch/mils (thousandths of an inch channel wall thickness)), and a fully formulated three-way catalyst washcoat comprising Pd/Rh at 70:30 weight ratio at 10 g/ft³ also comprising a ceria-zirconia based mixed oxide OSC and an alumina-based refractory oxide support at a loading of 1.6 g/in³ split 50:50 between a first plurality of channels and a second plurality of channels. The washcoat comprised a D50 of 2-4 microns and a D90 of <10 microns. The washcoat solids used was 19% which was thickened using a thickening agent as known to the skilled person to a target viscosity of 900-1000 cP as measured at 20° C. on a Brookfield RV DVII+ Extra Pro viscometer using a SC4-27 spindle at 50 rpm spindle speed. The coating method used was according to the first method disclosed in UK patent publication no. 2524662, i.e. introducing a pre-determined amount of a liquid into a containment means at an upper end of the filter substrate; and applying a vacuum to a lower end of the filter substrate. The vacuum used is as described in the description above, but a combination at shorter duration and lower vacuum strength was used. The coated product was dried and calcined in the usual way.

When the washcoat described in this Example was applied in a first step to this different substrate via the first plurality of channels using the first method disclosed in UK patent publication no. 2524662, the washcoat was "pulled through" the channel walls so that a wedge-shaped profile was observed by SEM only in that section of the substrate at the first face end of the substrate but in the second plurality of channels. The "thick end" of the wedge-shaped profile at the first face end was at the "plug end" of the second plurality of channels of the wall flow filter. It was determined also that TWC was located in-wall in the channel walls of the first approximately 50% of the longitudinal direction extending from the first face. The "thin end" of the observable on-wall coating wedge profile extended to about 50% along the second plurality of channels in the longitudinal direction from the first face towards the second face.

In a second step, the second plurality of channels of the substrate coated with the first "wedge" was then coated to a nominal 50% depth from the second face end using the first method disclosed in UK patent publication no. 2524662 and this resulted in a second on-wall wedge shaped coating profile to about 50% of the longitudinal direction in the second plurality of channels (with some coating also in-wall) with the thick end of the wedge at the open channel ends at the second face. The arrangement obtained is shown schematically in FIG. 5.

A reference sample to Example 5 was prepared for comparison, wherein the same substrate type, coating method, precious metal and washcoat loading were used to prepare Example 5 except in that the washcoat comprised a D50 of 4-6 microns and a D90 of <20 microns. The washcoat solids used was 26.65% and the washcoat was thickened using a thickening agent as known to the skilled person to a target viscosity of 900-1000 cP as measured at 20° C. on a Brookfield RV DVII+ Extra Pro viscometer using a SC4-27 spindle at 50 rpm spindle speed.

Both the sample of Example 5 and the Example 5 Reference sample (comparative) were analysed using SEM and measurements of images at three intervals denoted A-C (3 were taken at regular intervals along the longitudinal direction). The total of inlet and outlet channel on-wall washcoat thickness (correlating to a % of the total washcoat at that interval, assuming a uniform coating) was then used to infer the quantity of washcoat located in-wall. The results are shown in the Tables below. The inlet channels correspond to the first plurality of channels; and the outlet channels correspond to the second plurality of channels.

| Position | % washcoat on inlet channel wall | % washcoat in-wall | % washcoat on outlet channel wall |
| --- | --- | --- | --- |
| A (front) | 0 | 48.3 | 51.8 |
| B (middle) | 10.3 | 75.6 | 14.1 |
| C (rear) | 6.1 | 3.5 | 63.4 |

REFERENCE

| Position | % washcoat on inlet channel wall | % washcoat in wall | % washcoat on outlet channel wall |
| --- | --- | --- | --- |
| A (front) | 17 | 33.6 | 48.9 |
| B (middle) | 11 | 54.9 | 34 |
| C (rear) | 9.1 | 47.7 | 43.2 |

The Reference sample (comparative) was found to have a more homogeneous distribution of washcoat along the (axial) length (i.e. longitudinal direction) of the part rather than the more pronounced wedge shape seen in Example 4.

Example 6

A cold flow back pressure analysis of the coated and aged filters Example 4 and its Reference (comparative) was done using the Superflow SF1020 apparatus available commercially at http://www.superflow.com/Flowbenches/sf1020.php.

At 21° C. ambient temperature and at a flow rate of 700 m$^3$/hr, the results are as follows:

Example 4=92.82 mbar @ 700 m$^3$/hr (9.28 KPa); and
Example 4 Reference (comparative)=116.56 mbar @ 700 m$^3$/hr (11.66 KPa).

From these data it can be seen that, by adjusting the D90 of the washcoat components, catalytic wall-flow filters according to the invention additionally provide the advantage of lower back pressure compared with conventional gasoline particulate filters.

Although preferred embodiments of the invention have been described herein in detail, it will be understood by those skilled in the art that variations may be made thereto without departing from the scope of the invention or of the appended claims. For the avoidance of doubt, the entire contents of all documents cited herein are incorporated herein by reference.

The invention claimed is:

1. A catalytic wall-flow monolith for use in an emission treatment system, wherein the monolith comprises a porous substrate and a three-way catalyst (TWC), wherein the TWC is distributed substantially throughout the porous substrate and wherein the TWC comprises:
   (i) alumina;
   (ii) one or more platinum group metals; and
   (iii) an oxygen storage component (OSC),
wherein the OSC comprises ceria or one or more mixed oxides comprising cerium and is present in a ratio by weight of OSC to alumina of from 65:35 to 85:15.

2. The catalytic wall-flow monolith according to claim 1, wherein the OSC comprises a ceria.

3. The catalytic wall-flow monolith according to claim 2, wherein the OSC comprises a mixed oxide of cerium and zirconium; a mixed oxide of cerium, zirconium, and neodymium; a mixed oxide of praseodymium and zirconium; a mixed oxide of cerium, zirconium and praseodymium; or a mixed oxide of praseodymium, cerium, lanthanum, yttrium, zirconium and neodymium.

4. The catalytic wall-flow monolith according to claim 3, wherein the OSC comprises praseodymium and is present at 2-10 wt %.

5. The catalytic wall-flow monolith according to claim 3, wherein the OSC comprises praseodymium and wherein the first plurality of channels comprises an on wall TWC coating comprising the OSC comprising praseodymium.

6. The catalytic wall-flow monolith according to claim 1, wherein the ratio by weight of OSC to alumina is about 75:25.

7. The catalytic wall-flow monolith according to claim 1, wherein the one or more platinum group metals is selected from Pt, Pd and Rh, or combinations of two or more thereof.

8. The catalytic wall-flow monolith according to claim 1, wherein the TWC is homogenous throughout the porous substrate.

9. The catalytic wall-flow monolith according to claim 1, wherein the monolith has a first face and a second face defining a longitudinal direction therebetween and first and second pluralities of channels extending in the longitudinal direction, wherein the first plurality of channels is open at the first face and closed at the second face, and wherein the second plurality of channels is open at the second face and closed at the first face, and wherein the TWC is further present as a coating on a surface of at least one of the first and second plurality of channels.

10. The catalytic wall-flow monolith according to claim 9, wherein the mean minimum thickness of the substrate between adjacent channels is from 8 to 20 mil (0.02 to 0.05 cm).

11. The catalytic wall-flow monolith according to claim 9, wherein (a) an amount by weight of the one or more platinum group metal, per unit volume of an on-wall coating present on channel wall surfaces of the first plurality of channels varies continually along the longitudinal direction; and/or (b) a layer thickness of an on-wall coating—or substantially on-wall coating—present on channel wall surfaces of the first plurality of channels varies continually along the longitudinal direction.

12. An emission treatment system for treating a flow of a combustion exhaust gas, the system comprising the catalytic wall-flow monolith according to claim 1.

13. A positive ignition engine comprising an emission treatment system according to claim 12.

14. An automobile comprising the engine according to claim 13.

15. A method for the manufacture of a catalytic wall-flow monolith, comprising:
providing a porous substrate having a first face and a second face defining a longitudinal direction therebetween and first and second pluralities of channels extending in the longitudinal direction, wherein the first plurality of channels is open at the first face and closed at the second face, and wherein the second plurality of channels is open at the second face and closed at the first face;
infiltrating the porous substrate with a washcoat containing a catalytic material; and
calcining the catalytic material within the porous substrate,
wherein the catalytic material comprises:
(i) alumina;
(ii) one or more platinum group metals; and
(iii) an oxygen storage component (OSC),
wherein the OSC comprises ceria or one or more mixed oxides comprising cerium and is present in a ratio by weight of OSC to alumina of from 65:35 to 85:15.

16. The method according to claim 15, wherein preparation of the washcoat before infiltrating the porous substrate includes:
mixing Pt and/or Pd with alumina and calcining to form at a first portion of the catalytic material.

17. The method according to claim 15, wherein preparation of the washcoat before infiltrating the porous substrate includes:
mixing Rh with the OSC and calcining to form a second portion of the catalytic material.

18. The method according to claim 15, wherein the catalytic wall-flow monolith is the monolith according to claim 1.

19. A method of treating a combustion exhaust gas from a positive ignition internal combustion engine containing oxides of nitrogen ($NO_x$), carbon monoxide (CO) unburned hydrocarbon fuel (HC) and particulate matter (PM), which method comprising contacting the exhaust gas with a catalytic wall flow filter according to claim 1.

* * * * *